(12) United States Patent
Rattunde

(10) Patent No.: US 11,173,741 B2
(45) Date of Patent: Nov. 16, 2021

(54) MARKING HEAD HAVING A PRESSURE SENSOR

(71) Applicant: RATTUNDE AG, Ludwigslust (DE)

(72) Inventor: Ulrich Rattunde, Ludwigslust (DE)

(73) Assignee: Rattunde AG, Ludwigslust (DE)

( * ) Notice: Subject to any disclaimer, the term of this patent is extended or adjusted under 35 U.S.C. 154(b) by 0 days.

(21) Appl. No.: 16/767,662

(22) PCT Filed: Nov. 21, 2018

(86) PCT No.: PCT/EP2018/082084
§ 371 (c)(1),
(2) Date: May 28, 2020

(87) PCT Pub. No.: WO2019/105828
PCT Pub. Date: Jun. 6, 2019

(65) Prior Publication Data
US 2020/0369071 A1    Nov. 26, 2020

(30) Foreign Application Priority Data
Nov. 30, 2017  (DE) .......................... 102017128475.3

(51) Int. Cl.
*G01M 99/00*    (2011.01)
*B44B 3/00*    (2006.01)
(52) U.S. Cl.
CPC ........... *B44B 3/009* (2013.01); *G01M 99/008* (2013.01)

(58) Field of Classification Search
CPC ........ B44B 3/009; G01M 99/008; C21D 7/08; B25D 9/02; B25D 9/18; B25D 9/08
See application file for complete search history.

(56) References Cited

U.S. PATENT DOCUMENTS

2016/0108487 A1*   4/2016   Ehrl .......................... C21D 7/08
                                                                    29/90.01

FOREIGN PATENT DOCUMENTS

| DE | 102006056388 B3 | 5/2008 | |
| DE | 202008017427 U1 | 8/2009 | |
| FR | 2327871 A1 | 5/1977 | |
| WO | WO-2012016754 A1 * | 2/2012 | ............. B25D 16/00 |

OTHER PUBLICATIONS

International Search Report, European Patent Office, dated Mar. 14, 2019.

* cited by examiner

*Primary Examiner* — Peter J Macchiarolo
*Assistant Examiner* — Anthony W Megna Fuentes
(74) *Attorney, Agent, or Firm* — Bay State IP, LLC

(57) ABSTRACT

A method for verifying a marking (8), wherein compressed air is continually supplied to a needle piston (2), which oscillates in a needle head housing (7) of a marking head (1) and which has a needle (3) on one end, which inserts the marking (8) into a surface (4), pressure fluctuations are formed in a compressed air supply line (10) during the oscillation, compressed air is continually measured in the compressed air supply line (10), a pressure profile is created and is compared to a reference pressure profile stored in an evaluating unit (12) and is evaluated.

5 Claims, 5 Drawing Sheets

MARKING HEAD HAVING A PRESSURE SENSOR

CROSS REFERENCE TO RELATED APPLICATION

This application is for entry into the U.S. National Phase under § 371 for International Application No. PCT/EP2018/082084 having an international filing date of Nov. 21, 2018, and from which priority is claimed under all applicable sections of Title 35 of the United States Code including, but not limited to, Sections 120, 363, and 365(c) and which in turn claims priority under 35 USC 119 to German Patent Application No. 102017128475.3 filed on Nov. 30, 2017.

BACKGROUND OF THE INVENTION

1. Field of the Invention

The invention relates to a method according to the preamble of claim 1.

2. Description of Related Art

For identification of workpieces the most varied marking systems based on material displacement are known.

Marking systems are known inter alia in which the marking is carried out with an oscillating, sharp, hard needle which can be moved through at least two co-ordinates and as a result alphanumeric characters and free symbols such as QR codes, company logos etc. are marked onto a surface. The principle is like that of a matrix printer, except that the sharp, oscillating needle imprints many points adjacent to one another into the material surface and as a result the marking is visible.

It is disadvantageous if a marking does not actually take place due to any kind of disturbance processes. Although the XY co-ordinate paths of the marking points can be monitored, this is no guarantee that the marking has actually taken place.

DE 10 2006 056 388 B3 discloses an apparatus for marking a workpiece using a marking tool which can be guided by means of an actuating drive along a marking path predetermined by a control device, which apparatus is assigned a marking checking unit which captures at least one first and second process parameter and generates a corresponding first and second check signal.

A disadvantage of the systems is that they are complex and susceptible to malfunction.

BRIEF SUMMARY OF THE INVENTION

It is an object of the present invention to provide a method which enables simple verification of a marking made by a marking head.

This object is achieved by a method for verifying a marking with the features of claim 1.

In the method according to the invention compressed air is continuously supplied to a piston, preferably a needle piston, which oscillates in a needle head housing of a marking head. The oscillating needle piston has at one end a needle which introduces the markings into a surface.

Pressure fluctuations of a compressed air supply line occur during the oscillation. The pressure of the compressed air supply line is continuously measured. A pressure profile of the pressure is produced and is compared with a reference pressure profile stored in the evaluating unit and is evaluated.

Thus, a method is advantageously provided which is less susceptible to malfunction and necessitates few structural changes relative to the known marking heads. A pressure sensor is provided which is already arranged on the compressed air supply line. The pressure values measured by the pressure sensor are captured and evaluated. The pressure sensor should be very fast and should be able to accommodate pressure fluctuation frequencies of up to approximately 10 kHz or even higher.

The pressure measurement values over time are plotted or stored and evaluated.

For this purpose first of all a pressure profile of a freely oscillating needle is preferably measured and stored as a free reference pressure profile in the evaluating unit. The free reference pressure profile shows the progression of the pressure changes over time if the needle oscillates freely without penetrating even one single time into the surface for a marking. A frequency of the free reference pressure profile remains substantially the same, ideally constant, over the time progression.

In addition or instead, the pressure profile of a needle which produces a marking can be measured and stored as a marking reference pressure profile in the evaluating unit. In this case "a needle which produces a marking" is understood to mean that with each oscillation the needle penetrates into the surface, that is to say it produces a perfect marking or at least produces an almost perfect marking, and penetrates into the surface at least in more than 90 percent, preferably more than 95 percent of each of the oscillations. The marking reference pressure profile is stored in the evaluating unit.

During a marking process the actual pressure profile is continuously measured. "Continuously measured" here means that so many pressure measurement values are determined that a continuous pressure gradient can be determined at least by interpolation or the like.

The pressure is measured by the pressure sensor and likewise supplied to the evaluating unit. In the evaluating unit the pressure profile determined therefrom or the pressure profile can be compared with the free reference pressure profile and/or with the marking reference pressure profile.

A frequency of the free reference pressure profile is advantageously determined and a frequency of the pressure profile is continuously measured, and the frequencies are compared with one another, and an error message is generated if the frequency of the pressure profile is not less than the frequency of the free pressure profile. If the needle oscillates freely, the associated needle piston has the maximum stroke, and the frequency is at a maximum when the compressed air is the same. If the needle penetrates into the surface the stroke is naturally smaller, since the piston does not hit a stop, but already beforehand impinges on the surface, and the frequency becomes greater. If the frequency of the pressure profile is not less than the frequency of the free pressure profile an error message is generated. Thus in particular an error message is generated if the frequencies of the two pressure profiles are the same, that is to say it is established by the comparison that the pressure profile corresponds to the free pressure profile at least with regard to the frequency, that is to say the needle oscillates freely. At that moment there is an error in the marking.

In another variant of the evaluation the marking reference pressure profile is compared with the pressure profile, and in the event of deviations an error message is generated. The comparison of the pressure profiles can take place by carrying out a Fourier analysis of the pressure profile and also of the marking reference pressure profile and comparison of the individual frequencies of the Fourier transforms with one another.

It is preferably also possible to carry out a Fourier analysis only of the pressure profile and, from the occurrence of specific frequencies, to extrapolate how far the needle is worn, whether the hardness of the surface has changed and further data.

The needle preferably oscillates to and fro in a Z direction, and the needle imprints a marking into the surface by the oscillation. The needle piston, on one side of which the needle is arranged, is pressed to the surface by compressed air and pressed back by a spring force. The compressed air and the spring force interact and generate the oscillating movement of the needle piston. During the oscillation in the longitudinal direction the compressed air flows around the needle piston and then out of an outlet from the marking head. Only in the maximally retracted position the needle piston is sealed by means of a gasket, so that no air can flow around the needle piston. At this moment the compressed air applies its maximum pressure to the needle piston and pushes the needle piston away towards the surface in the Z direction. Due to the acceleration and the inertia of the needle piston the needle tip penetrates into the surface and generates the marking. In this case the spring is compressed, and after introduction of the marking the needle piston is moved back again into its maximally retracted position by the relaxing spring.

BRIEF DESCRIPTION OF THE SEVERAL VIEWS OF THE DRAWINGS

The invention is described with reference to an embodiment in six drawings. In the drawings.

DETAILED DESCRIPTION OF THE SEVERAL EMBODIMENTS

Figure 1:
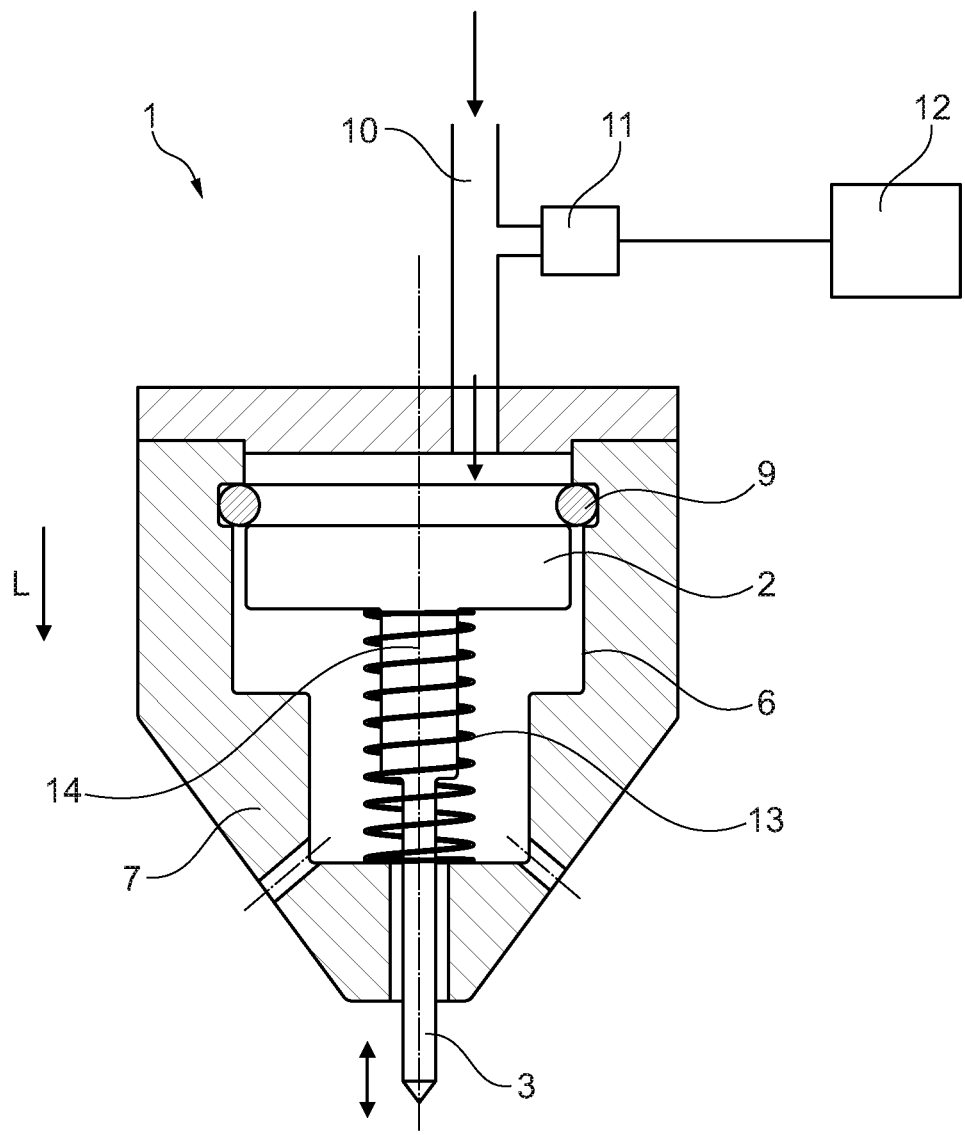
FIG. 1 shows a sectional view of a marking head according to the invention.

A marking head 1 in FIG. 1 has a needle piston 2 with a needle 3 which is arranged on an end of the needle piston 2 near the surface and is made from or includes a high-strength material, for example hard metal or diamond, or has at least one diamond on the tip. The needle piston 2 here is T-shaped in cross-section. The needle piston 2 has the greatest width along its head remote from a surface 4 to be processed, but it does not terminate close to an inner wall 6 of a needle head housing 7, so that air can flow past between the needle piston 2 and the inner wall 6 of the needle head housing 7. The air flow is represented by arrows in FIG. 2a.

The needle 3 is intended for introducing a marking 8 into the surface 4.

In a portion remote from the surface 4 the needle head housing 7 is sealed relative to the needle piston 2 by a gasket 9. The sealed off region is connected to a compressed air supply line 10 so as to conduct air. By means of the compressed air supply line 10 compressed air is continuously admitted into the portion of the needle head housing 7 remote from the surface 4. A pressure sensor 11 which is capable of recording pressure fluctuation frequencies up to 10 kHz is arranged laterally on the compressed air supply line 10. The pressure sensor 11 is connected electrically conductively and for data transfer to an evaluating unit 12. In a storage device the evaluating unit 12 records the pressure gradient measured by the pressure sensor 11 over a time t.

On the surface a spring 13, which exerts an opposing force to the compressed air and in interaction with the compressed air energises the needle piston 2 for oscillation to and fro in a longitudinal direction L, is laid around a T-leg 14 of the needle piston 2. In this case the oscillations can amount to 10 to 500 Hz, but the frequencies can also be lower and even higher depending upon the configuration of the needle head 2.

Figure 2A:
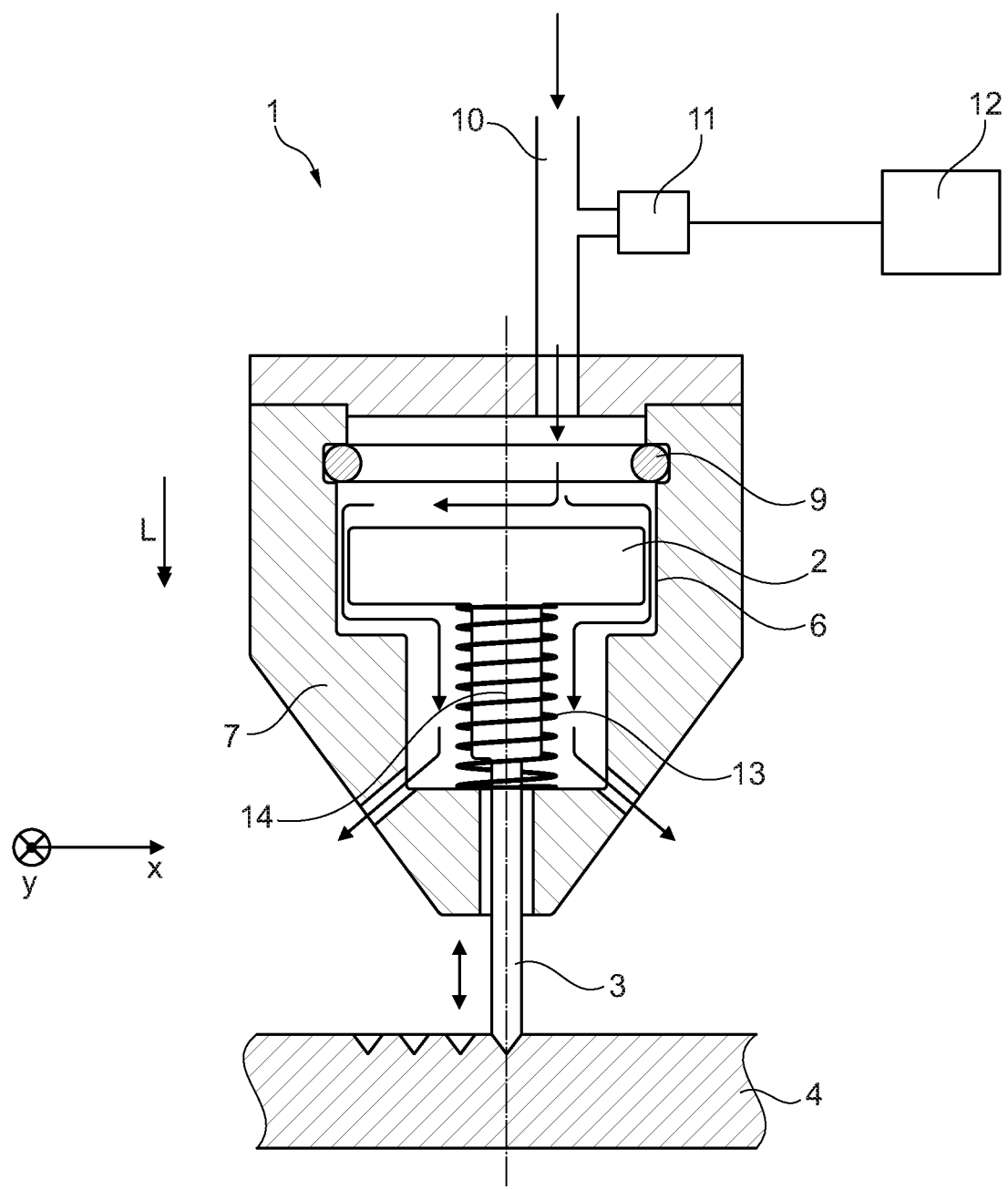
FIG. 2a shows a sectional view of the marking head according to the invention during a marking process.

In the completely retracted position of the needle 4 and of the needle piston 2 illustrated in FIG. 1 the end of the needle remote from the surface piston 2 terminates with the gasket ring 9. In this position the compressed air flowing out of the compressed air supply line 10 exerts a shock pulse on the needle piston 2, and the needle piston 2 is accelerated towards the surface 4. The position on the path towards the surface is illustrated in FIG. 2a. The needle piston 2 has moved away from the gasket ring 9, and the compressed air can flow laterally past the needle piston 2 and, in a portion of the marking head 1 near the surface, can flow out of the needle head housing 7 into an environment. As a result the pressure of the compressed air breaks down in the portion of the interior of the needle head housing 7 remote from the surface. In the position according to FIG. 1 in the completely retracted state the pressure sensor 11 experiences a maximum pulse. The pressure measured by the pressure sensor 11 decreases with the downward movement of the needle piston 2.

During the downward movement of the needle piston 2 the spring 13 is compressed, and the compressed spring 13 presses the needle piston 2 again into the other direction, so that the pressure on the pressure sensor 11 is raised again.

Figure 2B:
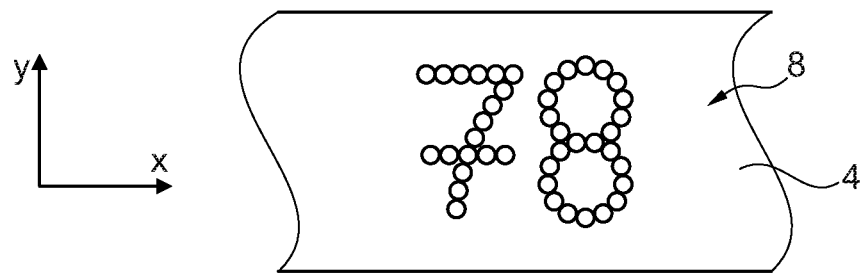
FIG. 2b shows a marking introduced into a surface.

This results in a quickly oscillating movement of the needle 3 which is used in order to introduce the marking 8 into the surface 4. The movement of the needle 3 takes place in the longitudinal direction L, which here corresponds to a Z direction, whilst the marking head 1 is moved by a control, for example a CN control or the like, in an XY plane and in this case the needle 3 marks free symbols such as for example QR codes, company logos etc. on the surface 4. In FIG. 2b the marking 8 in the form of the number "78" is selected.

During the downward movement of the needle 3 in the Z direction onto the surface 4 the movement naturally stops when the needle tip meets the surface 4, and the spring 13 immediately presses the needle piston 2 upwards again, away from the surface 4. This position is illustrated in FIG. 2a.

The closer the surface 4 is positioned on the marking head 1, the shorter a stroke of a stroke movement of the needle piston 2 is, and as a result the frequency of the to-and-fro movement of the needle 3 is greater, or in other words the duration of an oscillation period is greater.

Figure 2C:
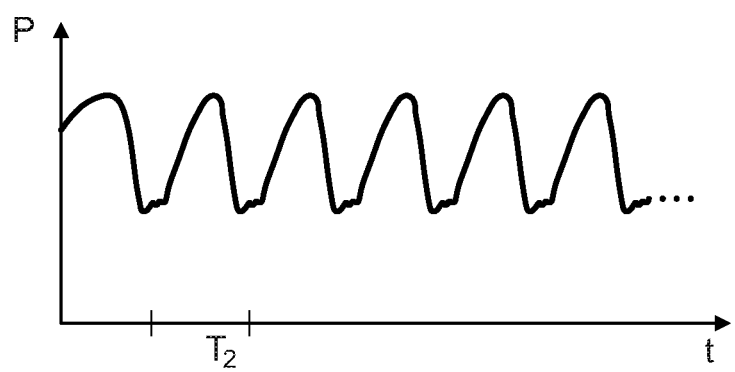
FIG. 2c shows a pressure gradient measured on a pressure sensor as a function of time.

When the needle 3 meets the surface 4, and thus the movement is suddenly interrupted, the pressure sensor 11 determines pulses which are depicted by way of example in FIG. 2c in the troughs of the otherwise substantially sinusoidal pressure gradient.

A marking pressure profile is depicted in FIG. 2c. The troughs of the pressure profile also give information about the wear on the needle head, about the strength of the surface and about the penetration depth of the needle tip into the surface 4. An analysis of the marking pressure profile can be obtained by Fourier analysis of the pressure profile, although this is not illustrated.

Figure 3A:
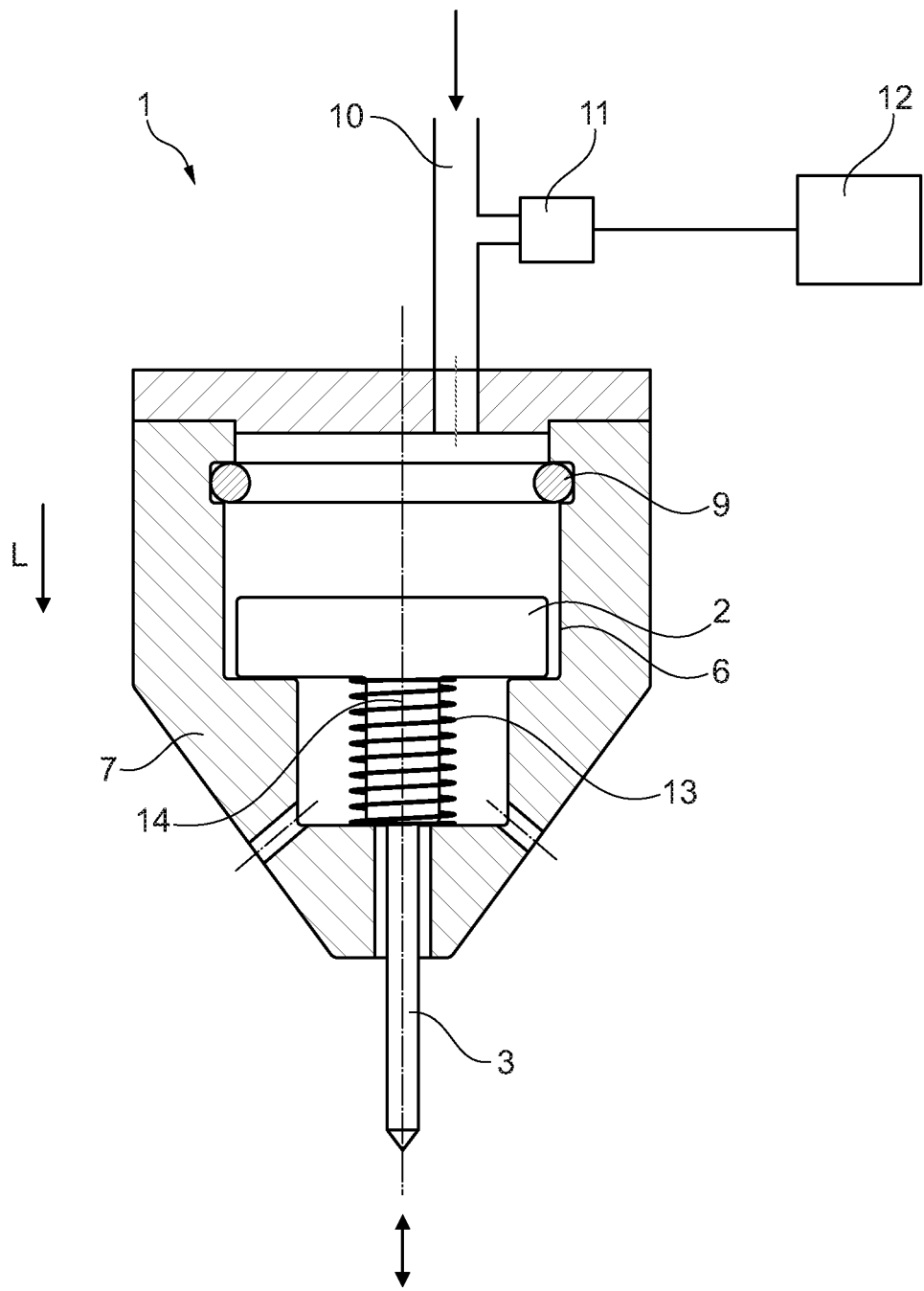
FIG. 3a shows a marking head according to the invention with freely oscillating needle.
Figure 3B:
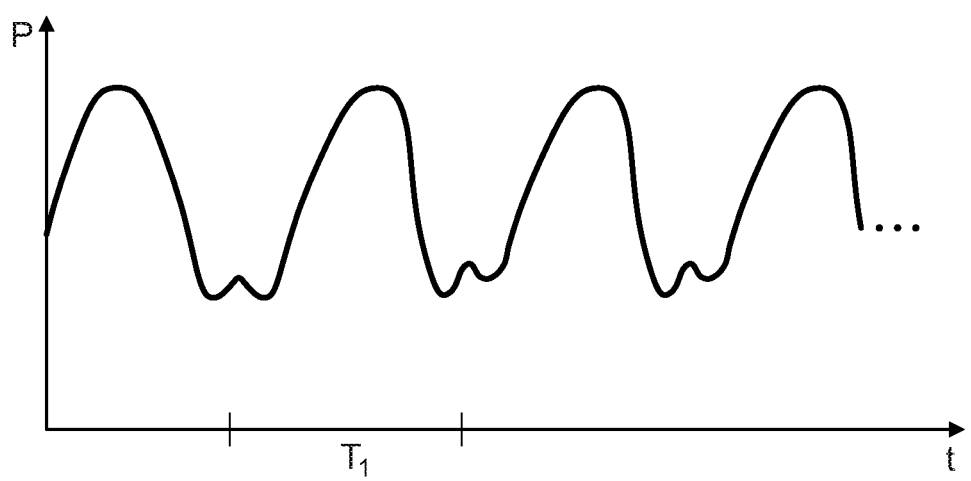
FIG. 3b shows the pressure gradient over time measured on the pressure sensor.

FIGS. 3a and 3b show the same marking head 1 with oscillating needle piston 2, but no surface 4 is present. The needle piston 2 oscillates freely, and in FIG. 3b a free reference pressure profile is measured. Because the stroke of the needle piston 2 in a free oscillation movement is greater than the stroke of the needle piston 2 in a marking oscillation movement, the frequency will be lower, that is to say a duration T1 of a period of the free reference pressure profile will be greater than a duration T2 of a period of the marking pressure profile.

Furthermore, because of the contact with the surface 4 a curve profile is produced in the troughs of the pressure profile and likewise deviates from the curve profile of the marking pressure profile.

It should be determined by the pressure sensor 11 and the evaluating unit 12 connected thereto whether the needle 3 actually introduces the marking 8 into the surface 4 during the oscillation or vibration or whether the needle 3 possibly oscillates freely or is jammed or something similar, that is to say no marking 8 is introduced into the surface 4. For this purpose the free reference pressure profile previously measured in FIG. 3b is stored in a storage device of the evaluating unit 12.

The free reference pressure profile according to FIG. 3b gives information about the pressure gradient of the marking head 1 in its present state when the needle 3 oscillates freely and no marking 8 is introduced into the surface 4. During the marking process, according to FIG. 2a the pressure is measured continuously by the pressure sensor 11 and is fed to the evaluating unit 12. The marking pressure profile can be stored, at least stored for a short time. The marking pressure profile must differ constantly and continuously from the free reference pressure profile in particular in the troughs. If the needle 3 should oscillate freely during several periods or also only one period, for instance because the surface 4 is too far away from the needle 3, the marking pressure profile of FIG. 2c takes on the same configuration or at least substantially the same configuration as the free reference pressure profile of FIG. 3b. By comparison of the two pressure profiles it is possible to precisely determine the time periods in which the needle 3 oscillates freely and no marking 8 is introduced into the surface 4. Then an error signal is generated, the marking 8 is terminated or at least an indication is given that there is a malfunction of the marking process there.

Furthermore, a marking reference pressure profile is also stored in the evaluating unit 12. This is a reference pressure profile which is determined when a perfect or at least an almost perfect marking 8 is carried out, that is to say each oscillation movement penetrates into the surface 4. In addition to the comparison with the free reference pressure profile, the marking pressure profile actually occurring during a marking operation is preferably also compared with the marking reference pressure profile. In the event of deviations of the marking pressure profile from the marking reference pressure profile an error signal is likewise output in order to signal that there is an irregularity in the marking process. The markings 8 can then be automatically separated out, or at least an error message can be delivered to the operating personnel.

LIST OF REFERENCE NUMERALS 1 marking head
2 needle piston
3 needle
4 surface
6 inner wall
7 needle head housing
8 marking
9 gasket ring
10 compressed air supply line
11 pressure sensor
12 evaluating unit
13 spring
14 T-leg
L longitudinal direction
t time
T1 duration
T2 duration

The invention claimed is:

1. A method for verifying a marking (8), wherein compressed air is continually supplied to a needle piston (2), which oscillates in a needle head housing (7) of a marking head (1) and which has a needle (3) on one end, which creates the marking (8) into a surface (4); during the oscillation, pressure fluctuations occur in a compressed air supply line (10), air pressure in the compressed air supply line (10) is continuously measured, and a pressure profile is produced and is compared with a reference pressure profile stored in an evaluating unit (12) and is evaluated; characterised in that the needle piston (2) oscillates to and from in a Z direction and due to the oscillation, the needle (3) imprints the marking (8) in the surface (4) and the needle piston (2) is pressed to the surface (4) by compressed air and pressed back by a spring force; during the oscillation, the compressed air flows around the needle piston (2) and out of an outlet from the needle piston housing (7) of the marking head (1); and in a maximally retracted position, the compressed air is prevented from flowing past the needle piston (2) by means of a gasket ring (9).

2. The method according to claim 1, characterised in that a pressure gradient of the needle (3) freely oscillating is measured and is stored in the evaluating unit (12) as a free reference pressure profile.

3. The method according to claim 2, characterised in that a frequency of the free reference pressure profile is determined and a frequency of the pressure profile is continuously measured, the frequencies are compared with one another, and an error message is generated if the frequency of the pressure profile is not less than the frequency of the free pressure profile.

4. The method according to claim 1, characterised in that a pressure gradient of the needle (3) generating the marking (8) is measured and is stored in the evaluating unit (12) as a marking reference pressure profile.

5. The method according to claim 4, characterised in that the marking reference pressure profile is compared with the pressure profile, and in the event of deviations an error message is generated.

* * * * *